May 23, 1967  W. A. CURRY  3,321,138
SPRINKLER CONTROL MEANS AND COMBINATION
Filed Sept. 16, 1965
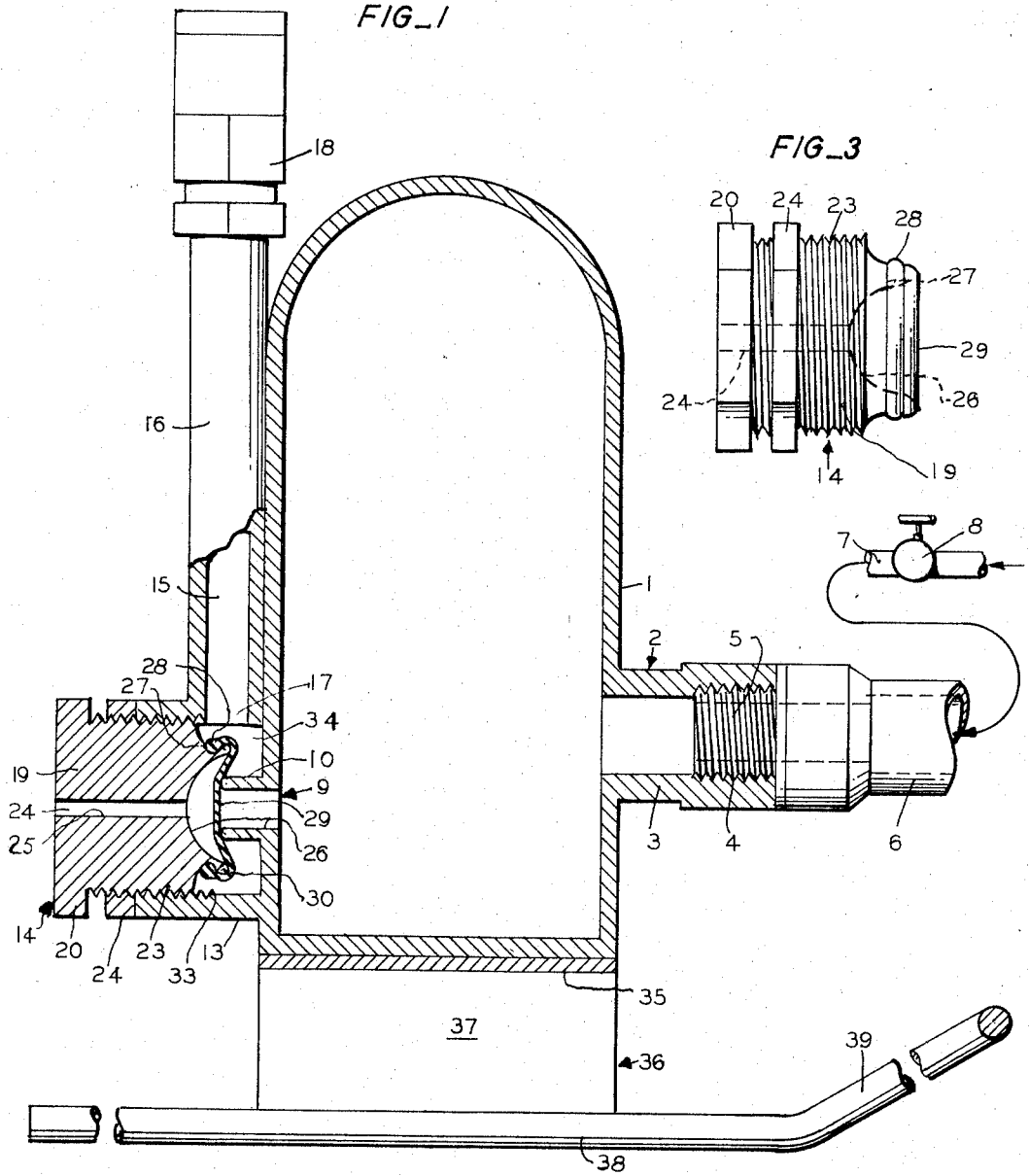
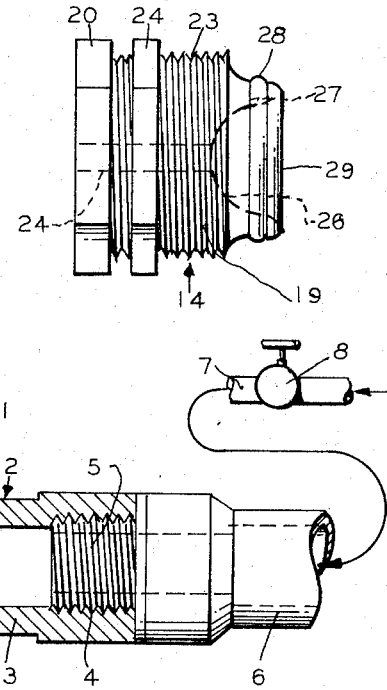
INVENTOR.
WALTER A. CURRY
BY
Baylen, Mohler & Foster
ATTORNEYS

United States Patent Office 3,321,138
Patented May 23, 1967

3,321,138
SPRINKLER CONTROL MEANS AND COMBINATION
Walter A. Curry, 1680 Fresno Ave., Oroville, Calif. 95965
Filed Sept. 16, 1965, Ser. No. 487,847
6 Claims. (Cl. 239—99)

This invention relates to control means for automatically controlling the intermittent discharge of liquid under pressure from a pressure source, both as to the volume and pressure of the liquid discharged and as to the frequency of the discharge.

One adaptation of the invention is with respect to sprinklers, such as lawn and garden sprinklers. Heretofore relatively complicated and costly arrangements have been devised to effect an automatic intermittent discharge of the water. The advantages of effecting an intermittent discharge, and particularly one in which the discharge is effected by a progressively decreasing pressure on the water after an initial maximum pressure, are known. By such intermittent discharge the water is permitted to soak into the ground between discharges, instead of running away, and also the area around the discharge point is wetted from the discharge point outwardly, and vice versa, instead of the wetting occurring at fixed points.

To obtain the above results, resort has been had to mechanically actuated devices involving plungers, springs, etc., as well as water-driven wheels and other mechanical expedients, the sprinkler heads having been water driven thereby for movement thereof.

Where moving mechanical parts such as gears, pistons, wheels, etc., are incorporated in a control system for the present purpose, faulty operation is always present, including undesirable leakage, and the expense involved in the manufacture and assembly of parts is relatively high.

One of the objects of the present invention is the provision of a control system that is extremely simple and economical to make and is free from the objections above mentioned.

Another object of the invention is the provision of a sprinkler and control means therefor that is economical to make and that is free from moving parts where friction and losses occur, and which control means is easily and quickly adjustable to meet any desired situation from a full, uninterrupted flow to a relatively small or large flow at intermittent periods of different time durations, and which control means is adapted to provide an intermittent discharge at substantially any desired pressure within the limits of the pressure at the source, so as to enable the user to provide for wetting areas of different extent without wasting water.

Other objects and advantages will appear in the description and in the drawings, in which:

FIG. 1 is a vertical sectional view through a control means that includes a sprinkler head, the latter being shown in elevation, and an inlet valve between the control means and the source of liquid under pressure is shown, diagrammatically.

FIG. 2 is a reduced size top plan view of the device shown in FIG. 1 omitting the diagrammatically shown portion in FIG. 1.

FIG. 3 is a side elevational view of the regulating element in the device shown in FIG. 1 separate from the remainder of the device.

In detail, the invention illustrated in the drawings comprises a hollow, vertically disposed body 1, having an inlet 2 at one side thereof opening into the lower portion of the body. This inlet includes a boss 3 projecting laterally therefrom around the opening in said body, which boss provides a passageway for liquid under pressure, and said boss is internally threaded at its outer end, as at 4 for receiving the externally threaded portion 5 of a hose coupling on a hose 6. Such hose is connected with the outlet side of a pressure line 7 in which a valve 8 is positioned.

Whether the body 1 is connected with a hose or with a pipe in a relatively permanent system is immaterial, but the employment of a valve in the pressure line leading to the body 1 is important in obtaining full control of the discharge of liquid from the body. The valve 8 is of the type that is actuatable for controlling the volume of flow of liquid therepast.

At the side of the body opposite to inlet 2, the body is provided with an outlet 9 that includes a relatively small diameter, open-ended tubular projection 10 projecting laterally from the outlet opening in the body.

Coaxial with said tubular projection 10, which may be called an ejection nozzle, and spaced around the latter is a boss 13 that is rigid with said body at one end of the latter, and that projects laterally from said body at its opposite end a substantial distance outwardly of the outer end of the ejection nozzle 10.

The boss 13 is internally threaded within its outer end portion for a control unit, generally designated 14 (FIGS. 1, 3). A vertically extending passageway 15 within an upwardly extending pipe 16 opens into boss 13 through the upper side of the latter at 17. A conventional sprinkler head 18 is secured onto the upper end of the pipe 16 at a point adjacent to one side of the upper end of body 1. This sprinkler head may be of the type for ejecting a spray of circular, horizontally disposed outline, or a spray of rectangular outline, as desired, the upper end of pipe 16 being threaded or otherwise formed for permitting replacement or substitution of heads, which, in itself, is old in the art.

The control unit 14 comprises an externally threaded plug 19 formed with a head portion 20 that projects radially outwardly of the body of the plug at one end of the latter for engagement with a wrench or with the fingers of the hand.

This plug is externally threaded at 23 for threadedly engaging the internal threads in boss 13 for securement of the plug in said boss and for movement axially of the plug to different positions of adjustment. A lock nut 24 on said plug is adapted to secure the plug to the boss at any of the adjusted positions, although it is to be understood that where frequent adjustments of relatively short duration are desired, the lock nut may be omitted.

Plug 19 is formed with a central open ended bore 25 of relatively small diameter, and the inner end of said plug, or the end opposite to head 20 thereof, is preferably concavely spherically dished at 26.

The outside diameter of the plug around the dished end surface 26 is of reduced diameter and is formed with an annular outwardly opening recess 27 for receiving therein the annular bead 28 around a circular diaphragm 29.

The circular diaphragm 29 and bead 28 integral therewith are of elastic rubber or plastic, and the diameter of the bottom of the annular recess 27 is greater than that of the inside diameter of bead 28 so that the bead must be stretched to pass over the reduced diameter projecting inner end portion 30 of the plug and into said recess, and the diaphragm 29 will then be held over the inner open end of bore 24 in a stretched condition, or under tension.

The circular end edge of the projection 30 on the plug is rounded to provide a smooth convexly curved edge against which the diaphragm is held.

The projecting portion 30 may be externally relieved at 33, and the bead 28 and projection 30 are spaced from the inner surface of boss 13 when the plug 19 with the diaphragm 29 therein are screwed into the boss 13.

The spherically curved dished surface 26 extends to and is continuation of the curved outer edge of projection 30, and the diameter of said edge is substantially greater than the diameter of the outer circular edge of the ejection nozzle 10. Also the outer edge of the ejection nozzle 10 is convexly rounded transversely of the edge to provide a smooth surface.

When the plug 19 is screwed into the boss 13, the diaphragm 29 will engage the outer end of the ejection nozzle 10, and the farther the plug is screwed into the boss, the greater will be the pressure of the diaphragm against the ejection nozzle and the greater will be the tension of the diaphragm.

In the position shown in FIG. 1 in which the tension approaches the maximum, the space between the inner end of the plug, including diaphragm 29 and bead 28, and the outer sides of nozzle 10, the wall of body 1 and the inside of boss 13 communicates with the opening 17 of the passageway 15 that leads to the sprinkler head.

Preferably the angle between the axis of the discharge nozzle 10 and the portion of the diaphragm between the outer end of the nozzle and the inner end of projection 30 on the plug should not exceed 45 degrees when the plug is adjusted to provide maximum tension on the diaphragm. The relationship between the diaphragm, projection 30 including bead 28, and the opening 17 and boss 13 and body 1 is such that at all times there will be adequate communication between space 34 and opening 17 to provide for ample flow of water or liquid from said space to opening 13.

Body 1 is supported on and rigidly secured to the central portion 35 of the upper flat surface of a generally inverted U-shaped plate generally designated 36. The portion 35 projects equally to opposite sides of the body 1 at right angles to the axes of bosses 2 and 13, said axes being parallel. The width of plate 36 may be substantially equal to the diameter of body 1.

The sides of the U-shaped plate comprise vertical horizontally spaced, opposed legs 37, the lower ends of which are rigid with parallel, horizontally elongated, round sled runners 38 that are adapted to support body 1 spaced above the ground.

One of the corresponding end portions 39 of runners 38 extends upwardly and to joined relation at the forward side of the body, or at the side with which hose 6 is connected, whereby the sprinkler may be readily moved to different positions over the ground by pulling the hose.

The body 1 and all parts connected therewith except the sprinkler head, hose connection, sled runners and plate 36, may be molded from plastic, as a unit, or certain parts may be otherwise formed and connected together. The body 1 may be transparent for ready observation of the operation thereof.

The positioning of the ejection nozzle in the lower portion of the body 1 is preferable, and the inlet 2 being at a level above that of the outlet 9 to the nozzle, normally results in the water level in the bottom portion of the body 1 being at or above the outlet 9 when air pressure within the body 1 under the influence of incoming water commences to build up.

Assuming the control unit is used with the sprinkler head for sprinkling a narrow or small strip of lawn or ground at quite frequent intervals, the control plug 19 may be moved to axially reduce the tension of the diaphragm across the ejection nozzle 10 and the valve 8 is opened. The frequency of discharge at the sprinkler head will largely be determined by the degree at which valve 8 is opened, since the air pressure build-up in body 1 on the body of water in the body 1 and consequently on diaphragm 29 to the point where the diaphragm is forced away from the nozzle 10 will be relatively rapid.

If a longer time interval between discharges is desired, the flow through valve 8 is reduced by actuating said valve to reduce the flow. In any event, the spread or distance the water is ejected will be dependent upon the degree of pressure required to move the diaphragm 29 to open position, and this, in turn, depends upon the tension of the diaphragm.

As the water is discharged under the influence of the air in the air dome 1, the distance of the spray of water from the sprinkler head will be greatest when the air pressure is at its maximum, and the water will be ejected to a progressively lesser distance as the air pressure drops, thus wetting the ground or land between the sprinkler and the maximum distance to which the water is discharged.

Where a substantial intermittent sprinkle is desired, the tension on the portion of the diaphragm extending across the ejection nozzle 10 is increased, resulting in a higher pressure being developed in the air dome or chamber 1 for propelling the water from the sprinkler head.

By releasing the tension of the diaphragm against the ejection nozzle 10 sufficiently and applying a higher line pressure by opening valve 8, a continuous flow of water to the sprinkler head may be obtained, and, of course, the plug 19 may be retracted sufficiently to clear the nozzle 10, if desired, in which case the sprinkler would operate in substantially the same manner as if the control device were omitted.

The bore 24 in the plug 19 or control device 14 merely establishes atmospheric pressure behind the diaphragm 29 at all times and the concave spherical surface 26 of the plug provides a backing for the diaphragm where the adjustment between the tension of the diaphragm against the ejection nozzle 10 and the line pressure and degree to which valve 8 is opened are so related that a backing for the diaphragm would be required to prevent objectionable stretching of the latter when the device is in use.

The advantages of the present control means where an accurate but adjustable intermittent control of the flow of water or liquid is desirable is obvious. Where the line pressure or pressure source is reasonably uniform virtually any intermittent or continuous flow of uniform amounts of water may be accurately obtained and while the range is broadened where a relatively high pressure exists at the source, such as in a municipal water system, nevertheless the control within any pressure range is accurate, and virtually infinite variations may be obtained.

In a broad sense, the invention may be described as comprising a conduit for liquid having an inlet for liquid under pressure at one end of said conduit, and an outlet for said liquid at the other end. Said conduit includes an upstanding enlarged portion 1 for air and through the lower part of which the liquid is adapted to flow from the inlet to the outlet in unobstructed direct communication with the air thereabove, whereby said enlarged portion will provide an air dome within which the air will be compressed when the outlet is closed and while the liquid continues to flow, under pressure, from said inlet into said enlarged portion.

The elastic diaphragm 29 is supported in a closed position at a point between said enlarged portion and said outlet for movement from a closed position, under tension, thereon, closing said conduit to flow of liquid therethrough from said enlarged portion to said outlet, to an open position under the influence of the force of air compressed within said enlarged portion when the force transmitted by said compressed air against the liquid in said conduit between said point and the liquid within said enlarged portion exceeds the tension of said diaphragm yieldably holding said diaphragm in said closed position.

From the foregoing description it will be obvious that my invention is susceptible of changes and modifications without departing from the spirit of the invention, hence it is to be understood that the invention is limited only by the scope of the appended claims.

I claim:
1. A liquid control system for effecting intermittent discharge of liquid from a conduit connected with a source of liquid under pressure, comprising:
   (a) a conduit for liquid, having an inlet at one end for connection with said source and a discharge outlet at its other end for discharge of said liquid from said conduit;
   (b) said conduit including an upwardly projecting enlarged portion between said inlet and said outlet for air and through the lower part of which said liquid is adapted to flow from said inlet to said outlet in unobstructed direct communication with the air in said enlarged portion thereabove, whereby said enlarged portion will provide an air dome for compression of air therein when said outlet is closed and during flow of liquid from said source into said enlarged portion;
   (c) an elastic diaphragm supported under tension within said conduit at a point between said enlarged portion and said outlet for movement from a closed position closing said conduit at said point to flow of liquid in said conduit therepast to said outlet to an open position under the force of air compressed within said enlarged portion during flow of liquid from said source into said enlarged chamber when said force exceeds the tension of said diaphragm for holding said diaphragm in said closed position;
   (d) diaphragm supporting-means supporting said diaphragm under said tension in said closed position for said movement to said open position.

2. In a system as defined in claim 1:
   (e) said diaphragm supporting means including means for varying the degree of tension of said diaphragm for holding said diaphragm in said closed position.

3. In a system as defined in claim 1:
   (e) said conduit including an open ended tubular ejection nozzle at the side of said enlarged portion adjacent to said outlet for conducting said liquid from within said enlarged portion toward said outlet;
   (f) said diaphragm being circular and the outer open end of said tubular ejection nozzle relative the inside of said enlarged portion being closed by the central portion of said diaphragm;
   (g) the outer marginal portion of said diaphragm being under said tension in a direction opposite to the direction of flow of liquid through said nozzle for yieldably holding said central portion against said discharge end of said nozzle closing said end.

4. In a system as defined in claim 1:
   (e) valve means in said conduit at the side of said enlarged portion nearest to said inlet for controlling the volume of flow of said liquid into said enlarged portion; and,
   (f) means for moving said diaphragm supporting means toward and away from said nozzle axially of the latter for varying the tension of said diaphragm against said outer end of said nozzle.

5. In a system as defined in claim 4:
   (g) said conduit further including a housing enclosing said diaphragm in spaced relation thereto in a position between said outlet and said ejection nozzle and diaphragm for conducting water discharged from said ejection nozzle.

6. In combination with a hollow, vertically disposed body for air, having an inlet at one side thereof opening into the lower portion of said body and an outlet at the opposite side of said body opening into said lower portion;
   (a) a source of water under pressure;
   (b) a first conduit connecting said source with said inlet for conducting water from said source into said body;
   (c) a sprinkler;
   (d) a second conduit connecting said sprinkler with said outlet for conducting water within said body to said sprinkler;
   (e) control means in said second conduit including an elastic diaphragm extending across said second conduit adjacent to said outlet closing said second conduit to flow of water from said body to said sprinkler, said diaphragm being responsive to an increase in the pressure of air within said body to a predetermined degree for movement to an open position for opening said second conduit to flow of said water therethrough;
   (f) valve means in said first conduit for controlling the volume of flow of water through said first conduit into said body for regulating the rate of intermittent movement of said diaphragm to open position.

References Cited by the Examiner
FOREIGN PATENTS
755,032   6/1954   Germany.
1,044,496  11/1948  Germany.

EVERETT W. KIRBY, *Primary Examiner.*